(12) United States Patent
Kataumi et al.

(10) Patent No.: US 6,460,426 B1
(45) Date of Patent: Oct. 8, 2002

(54) HAND LEVER FOR COLUMN SHIFT DEVICE

(75) Inventors: Yoshimasa Kataumi, Saitama; Ryoichi Fujiwara, Shizuoka; Hirokazu Hirabayashi, Kanagawa, all of (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 09/691,101

(22) Filed: Oct. 19, 2000

(30) Foreign Application Priority Data

Oct. 19, 1999 (JP) .......................................... 11-296145

(51) Int. Cl.⁷ ............................................. F16H 59/02
(52) U.S. Cl. ......................... 74/473.31; 74/525; 403/84
(58) Field of Search ........................ 74/473.31, 473.32, 74/524, 525; 403/84, 103, 116

(56) References Cited

U.S. PATENT DOCUMENTS

| 1,908,423 | A | * | 5/1933 | Hjermstad ................... 403/83 |
| 3,417,635 | A | * | 12/1968 | Day et al. .................. 74/484 R |
| 4,073,199 | A | * | 2/1978 | Simons ....................... 180/328 |
| 5,022,283 | A | * | 6/1991 | Deslandes .................... 74/523 |
| 5,182,964 | A | * | 2/1993 | Gellner .................. 74/471 XY |
| 5,211,078 | A | * | 5/1993 | McCarthy et al. .......... 180/272 |
| 6,378,395 | B1 | | 4/2002 | Kataumi et al. |

* cited by examiner

Primary Examiner—Allan D. Herrmann
(74) Attorney, Agent, or Firm—Foley & Lardner

(57) ABSTRACT

A column shift device for motor vehicles includes a steering column, and a hand lever secured to the steering column in the vicinity of the upper end and including a knob arranged in the vicinity of the steering wheel and comprising two different and separate portions.

7 Claims, 3 Drawing Sheets

HAND LEVER FOR COLUMN SHIFT DEVICE

BACKGROUND OF THE INVENTION

The present invention relates generally to column shift devices for motor vehicles, and more particularly, to hand levers for the column shift devices.

Generally, there are proposed two constructions of hand levers for column shift devices. In one construction, a hand lever protrudes substantially perpendicularly with respect to an axis of a steering column, and extends laterally linearly to have an end with a knob in the vicinity of a steering wheel. In another construction, a hand lever extends laterally from a mounting base to the steering column, and then bends in the direction of the axis of the steering column to have an end with a knob in the vicinity of the steering wheel.

However, since the column shift device is located in front of an instrument panel, the hand lever obstructs assemblage of the instrument panel, lowering the efficiency thereof. Specifically, the instrument panel is typically assembled to a vehicle body after mounting and adjusting of the steering column with the column shift device in the vicinity of the steering wheel. Thus, if the column shift device includes a hand lever constructed as described above, the instrument panel is difficult to be mounted to the vehicle body at a mounting site above the shift device, requiring time and skill, resulting in lowered assemblage efficiency.

SUMMARY OF THE INVENTION

It is, therefore, an object of the present invention to provide column shift devices for motor vehicles, which contribute to an improvement in assemblage efficiency of the instrument panel.

Generally, the present invention provides a column shift device for a motor vehicle with a steering column, comprising:

a hand lever secured to the steering column in a vicinity of an upper end thereof, said hand lever including a knob arranged in a vicinity of a steering wheel, said hand lever comprising two different and separate portions.

One aspect of the present invention is to provide a column shift device for a motor vehicle with a steering column, comprising:

a hand lever secured to the steering column in a vicinity of an upper end thereof, said hand lever including a knob arranged in a vicinity of a steering wheel, said hand lever comprising two different and separate portions, said two portions including a first base arranged through a bearing of a base bracket fixed to the steering column and a second base having an end with said knob;

a select lever secured to another end of said second base to be perpendicular to an axis of said second base; and a plate secured to said second base to face said select lever.

Another aspect of the present invention is to provide a motor vehicle, comprising:

a steering wheel;

a steering column rotatably supporting said steering wheel; and a hand lever secured to said steering column in a vicinity of an upper end thereof, said hand lever including a knob arranged in a vicinity of the steering wheel, said hand lever comprising two different and separate portions.

A further aspect of the present invention is to provide a motor vehicle, comprising:

a steering wheel;

a steering column rotatably supporting said steering wheel;

a hand lever secured to said steering column in a vicinity of an upper end thereof, said hand lever including a knob arranged in a vicinity of the steering wheel, said hand lever comprising two different and separate portions, said two portions including a first base arranged through a bearing of a base bracket fixed to said steering column and a second base having an end with said knob;

a select lever secured to another end of said first base to be perpendicular to an axis of said first base; and a plate secured to said second base to face said select lever.

DETAILED DESCRIPTION OF THE INVENTION

Figure 1:
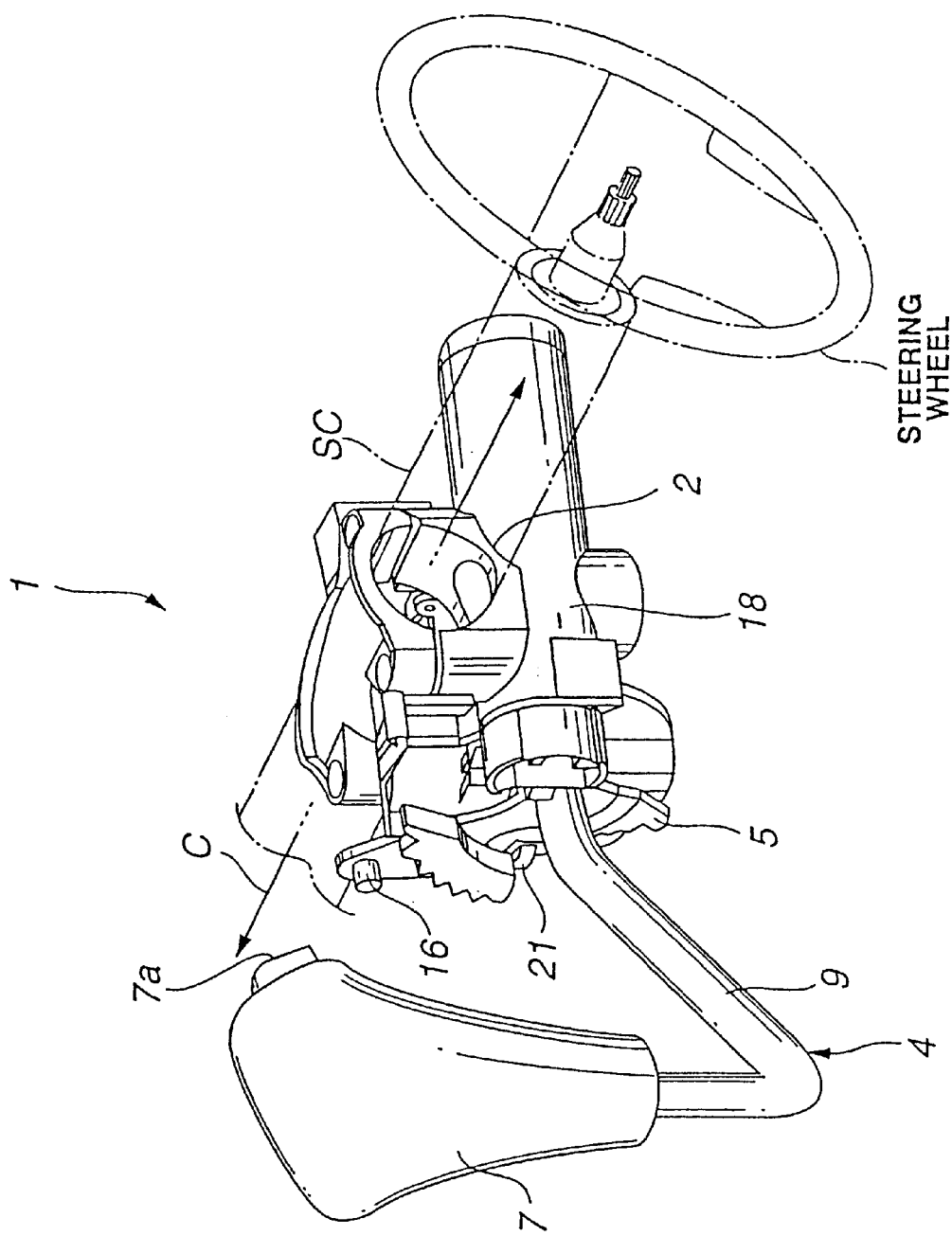
FIG. 1 is a perspective view showing a column shift device embodying the present invention.
Figure 2:
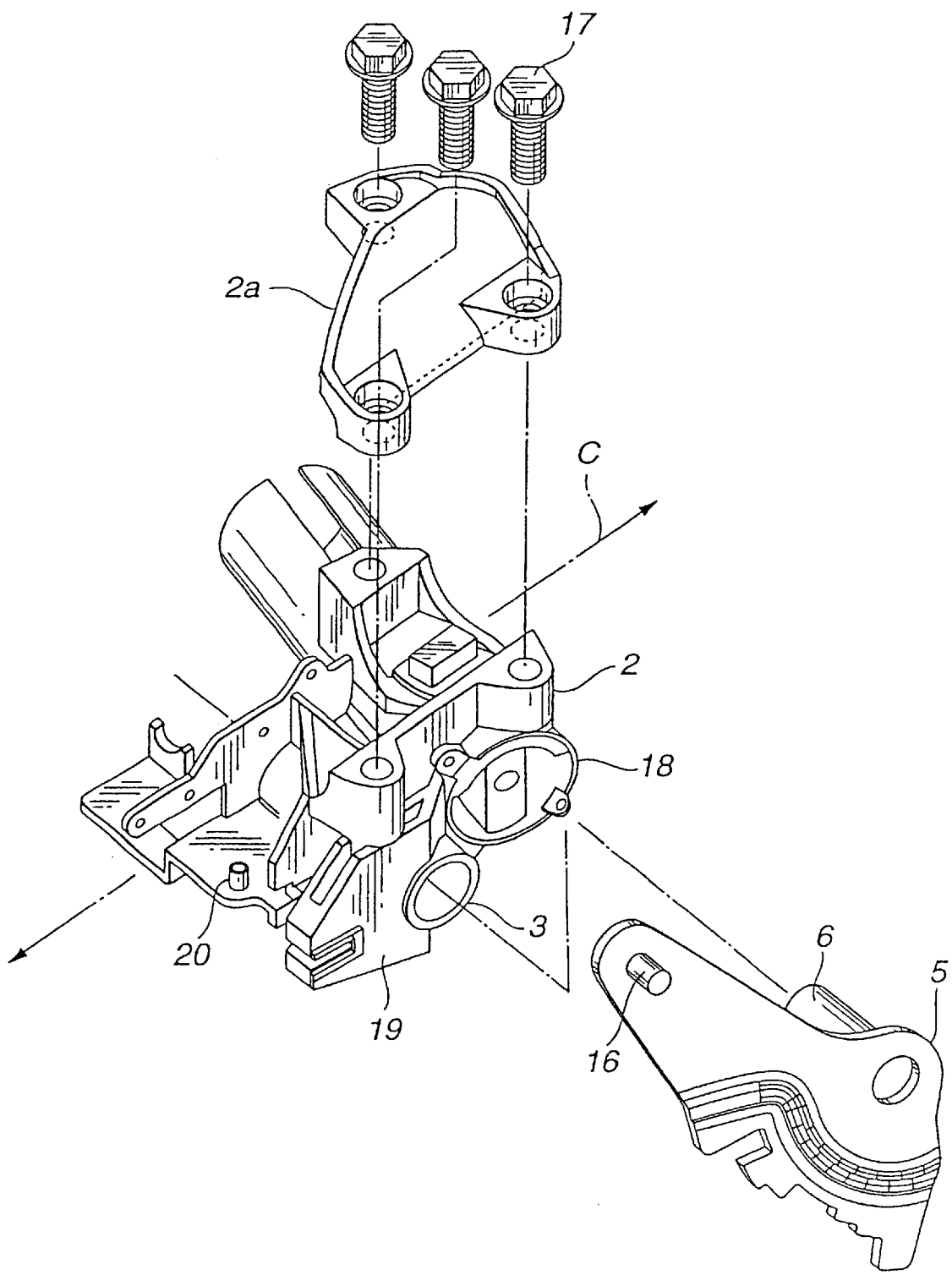
FIG. 2 is an exploded perspective view showing a main part of the column shift device.

Referring to FIGS. 1–2, a column shift device 1 embodying the present invention includes a base bracket 2 for holding and securing a jacket tube of a steering column SC, a bearing 3 arranged substantially perpendicularly with respect to an axis C of the steering column SC, and a hand lever 4 supported by the bearing 3 to be rotatable about an axis of the bearing.

Figure 3:
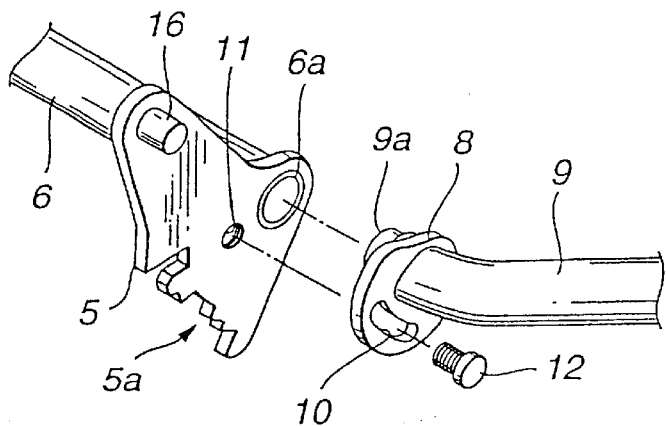
FIG. 3 is a view similar to FIG. 2, showing a hand lever.

Referring also to FIG. 3, the hand lever 4 includes two different and separate portions, i.e. a rotation or first base 6 comprising a control tube with an end secured to a select lever 5 and an operation or second base 9 comprising a control tube with an end secured to a knob 7 and another end secured to a plate 8. The control tubes of the rotation base 6 and the operation base 9 are engaged with each other for rotary support, whereas the select lever 5 and the plate 8 are put in contact with each other for tightening.

A structure for engaging the control tubes of the rotation base 6 and the operation base 9 with each other is in the form of a telescopic or double-tube device including an open end 6a of the control tube and a small cylinder 9a connected to an end of the control tube and having the outer diameter roughly equal to the inner diameter of the open end 6a. Optionally, the telescopic device may include a small protrusion obtained by machining the outer diameter of another end of the control tube to have a predetermined length of engagement. In the engaging structure, at least one of the two components can be rotated. The rotation base 6 is of the length which allows the select lever 5 to be disposed rotatable at the front of the bearing 3 of the base bracket 2, and is enough to pass through the bearing 3.

As seen in FIG. 3, a structure for putting the select lever 5 and the plate 8 in contact with each other includes a circular slot 10 formed in the plate 8 and having a circular portion with center at the control tube, a through hole 11 formed in the select lever 5 to correspond to the circular slot 10, and a bolt 12 engaged with the through hole 11 from the circular slot 10. The bolt 12 may be screwed into the through hole 11 itself or meshed with a nut arranged on the other side of the through hole.

Figure 4:
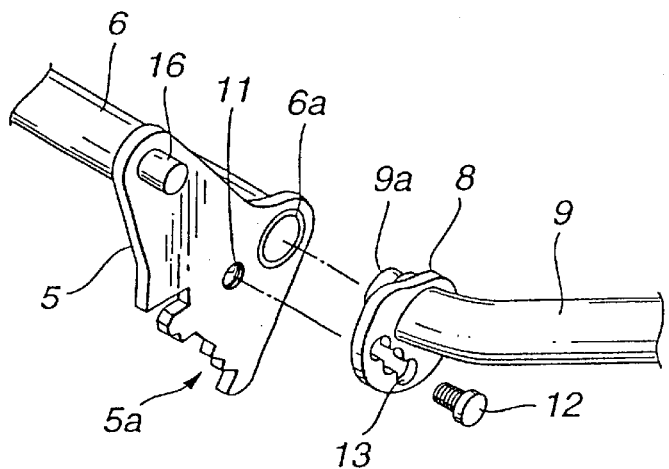
FIG. 4 is a view similar to FIG. 3, showing another hand lever.
Figure 5:
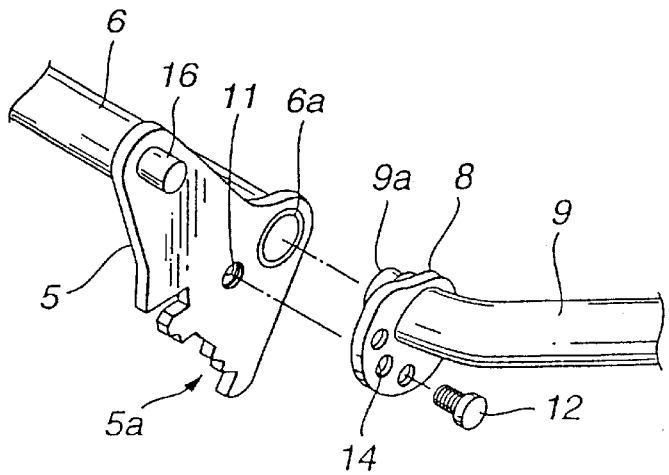
FIG. 5 is a view similar to FIG. 4, showing still another hand lever.

Optionally, the circular slot 10 may be replaced with a circular corrugated slot 8 as shown in FIG. 4, or a series of holes 14 as shown in FIG. 5, which is arranged in correspondence with the through hole 11 to tighten the plate 8 and the select lever 5 by the bolt 12. In the same way as the circular slot 10, the circular corrugated slot 13 and the series of holes 14 are disposed circularly along respective circles with center at the control tube. The circular corrugated slot 13 can be regarded as the series of holes 14 formed continuously adjacently.

The operation base 9 may rotatably be mounted to the rotation base 6. In the embodiment as shown in FIG. 3, for example, the circular slot 10 may be formed so that when assembling an instrument panel, the operation base 9 can be rotated to the position where it does not obstruct assemblage by loosening the bolt 12. Moreover, when assembling to a vehicle body a steering column with a column shift device assembled, the operation base 9 can be rotated in advance to the position where it does not obstruct assemblage of the instrument panel.

The relationship between the through hole 11 and the circular slot 10 and between the circular corrugated slot 13 and the series of holes 14 may be, of course, fully opposite to the above relationship. Briefly, any construction may be adopted wherein two different and separate portions of the hand lever 4 can be integrated after its mounting to the steering column and adjustment and also after assemblage of the instrument panel to the vehicle body, and they can be separated when assembling the instrument panel to the vehicle body.

The select lever 5 is formed with a detent 5a, and has a cable pin 16 serving to fix the control cable. Shown below the cable pin 16 is a check plate (no numeral) having a plurality of teeth which cooperate with a resilient spring member (not shown) to provide a controlled amount of resistance feeling when shifting between gear positions. Referring to FIGS. 1–2, the detent 5a is engaged and released from a guide 19 for holding an end of a detent lever 21 which is rotatably supported by on a pin 20 of the base bracket 2. The base bracket 2 is an aluminum cast, and includes cover 2a for concealing a main body of the base bracket for receiving the jacket tube. The over 2a and the main body are fastened by bolts 17. A key lock unit 18 is secured to the base bracket 2.

The hand lever 4 is maintained in a single unit without being separated into two portions until completion of assemblage of the column shift device1 to the steering column and adjustment thereof, and it is separated into two portions when assembling the instrument panel to the vehicle body. Integration and separation of the two portions of the hand lever 4 are a simple and easy operation of inserting and removing the bolt 12. By tightening the bolt 12 with the operation base 9 being rotated with respect to the rotation base 6 by a required angle in correspondence with the circular slot 10 or one of the holes 14, the position of the knob 7 can be adjusted optimally.

A wire is arranged through the hand lever 4 for transmitting operation of a knob button 7a of the knob 7. Thus, after separating the operation base 9 from the rotation base 6, the operation base 9 is kept suspended from the rotation base 6 by the wire. This results in no formation of an obstacle of the operation base 9 to assemblage of the instrument panel, nor difficult finding of the operation base 9 as separated.

Optionally, a rod may be used in place of the wire. It is noted that the rod should be constructed by two different and separate portions in the same way as the hand lever 4. In that case, a hinge may be arranged between the operation base 9 and the rotation base 6 so that the operation base 9 can be inclined with respect to the rotation base 6.

Having described the present invention with regard to the preferred embodiment, it is noted that the present invention is not limited thereto, and various changes and modifications can be made without departing from the scope of the present invention.

The entire contents of Japanese Patent Application No. 11-296145 are incorporated hereby by reference.

What is claimed is:

1. A column shift device for a motor vehicle with a steering column, comprising:

a hand lever secured to said steering column in a vicinity of an upper end thereof, said hand lever including a knob arranged in a vicinity of a steering wheel, said hand lever comprising two different and separate portions, said two portions including a first base arranged through a bearing of a base bracket fixed to the steering column and a second base having an end with said knob;

a select lever secured to another end of said first base to be perpendicular to an axis of said first base; and a plate secured to said second base to face said select lever.

2. The column shift device as claimed in claim 1, wherein said first base and said second base are rotatably engaged with each other.

3. The column shift device as claimed in claim 1, wherein one of said select lever and said plate has a through hole, and another of said select lever and said plate has a circular opening formed along a circle with center at one of said first base and said second base and corresponding to said through hole.

4. The column shift device as claimed in claim 3, wherein said circular opening comprises a circular slot.

5. The column shift device as claimed in claim 3, wherein said circular opening comprises a circular corrugated slot.

6. The column shift device as claimed in claim 3, wherein said circular opening comprises a series of holes.

7. A motor vehicle, comprising:

a steering wheel;

a steering column rotatably supporting said steering wheel;

a hand lever secured to said steering column in a vicinity of an upper end thereof, said hand lever including a knob arranged in a vicinity of the steering wheel, said hand lever comprising two different and separate portions, said two portions including a first base arranged through a bearing of a base bracket fixed to said steering column and a second base having an end with said knob;

a select lever secured to another end of said first base to be perpendicular to an axis of said first base; and a plate secured to said second base to face said select lever.

* * * * *